Feb. 24, 1931.  E. VAN HORN  1,793,656
AEROPLANE LANDING LIGHT
Filed Aug. 29, 1928  2 Sheets-Sheet 1
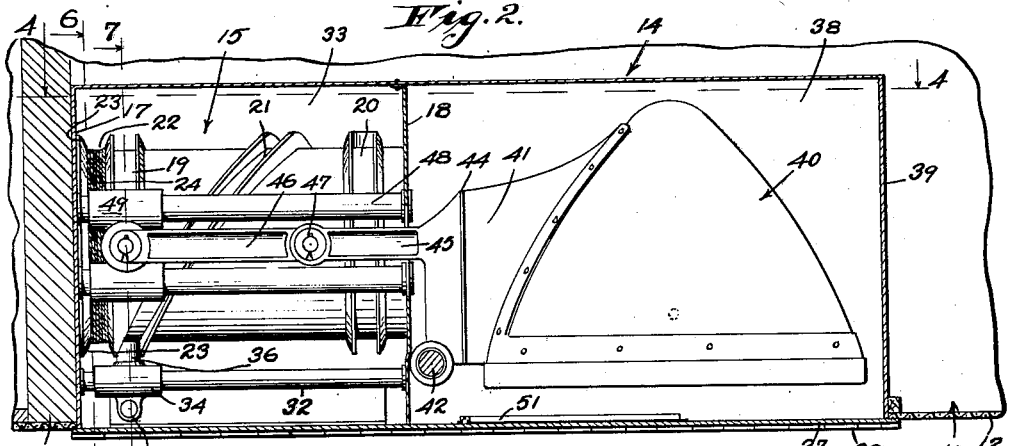
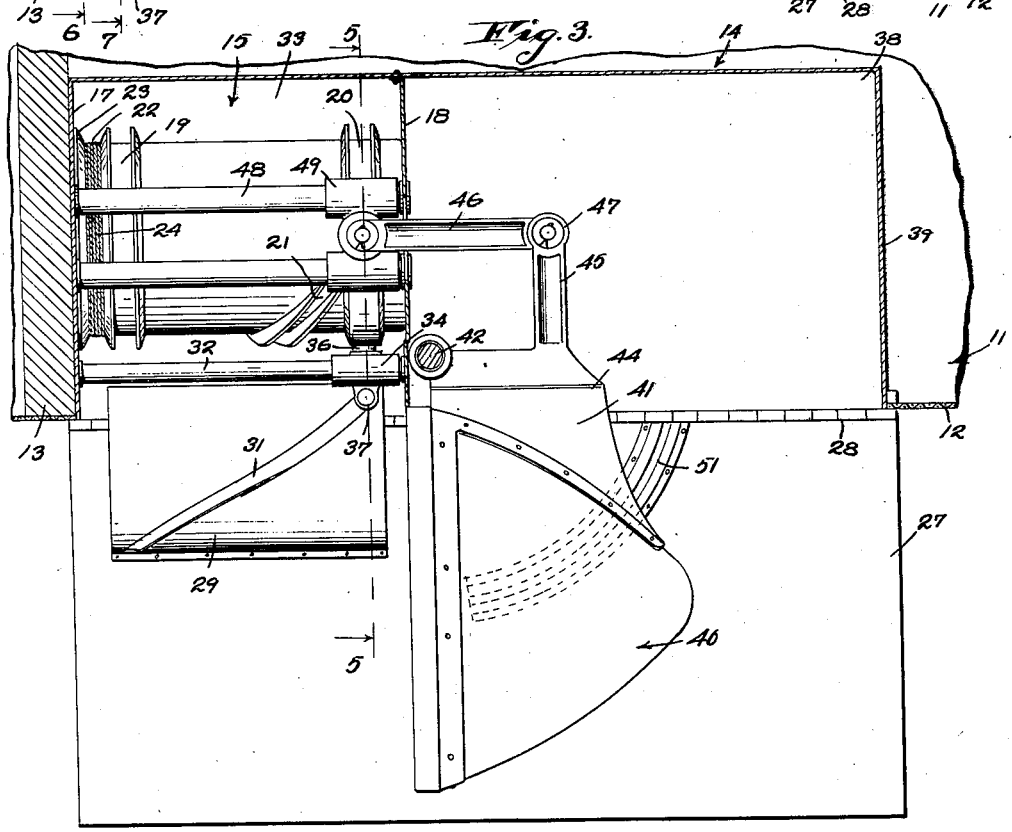
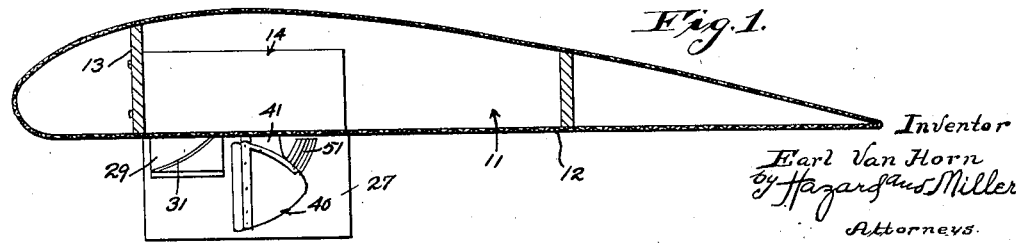
Inventor
Earl Van Horn
by Hazard and Miller
Attorneys

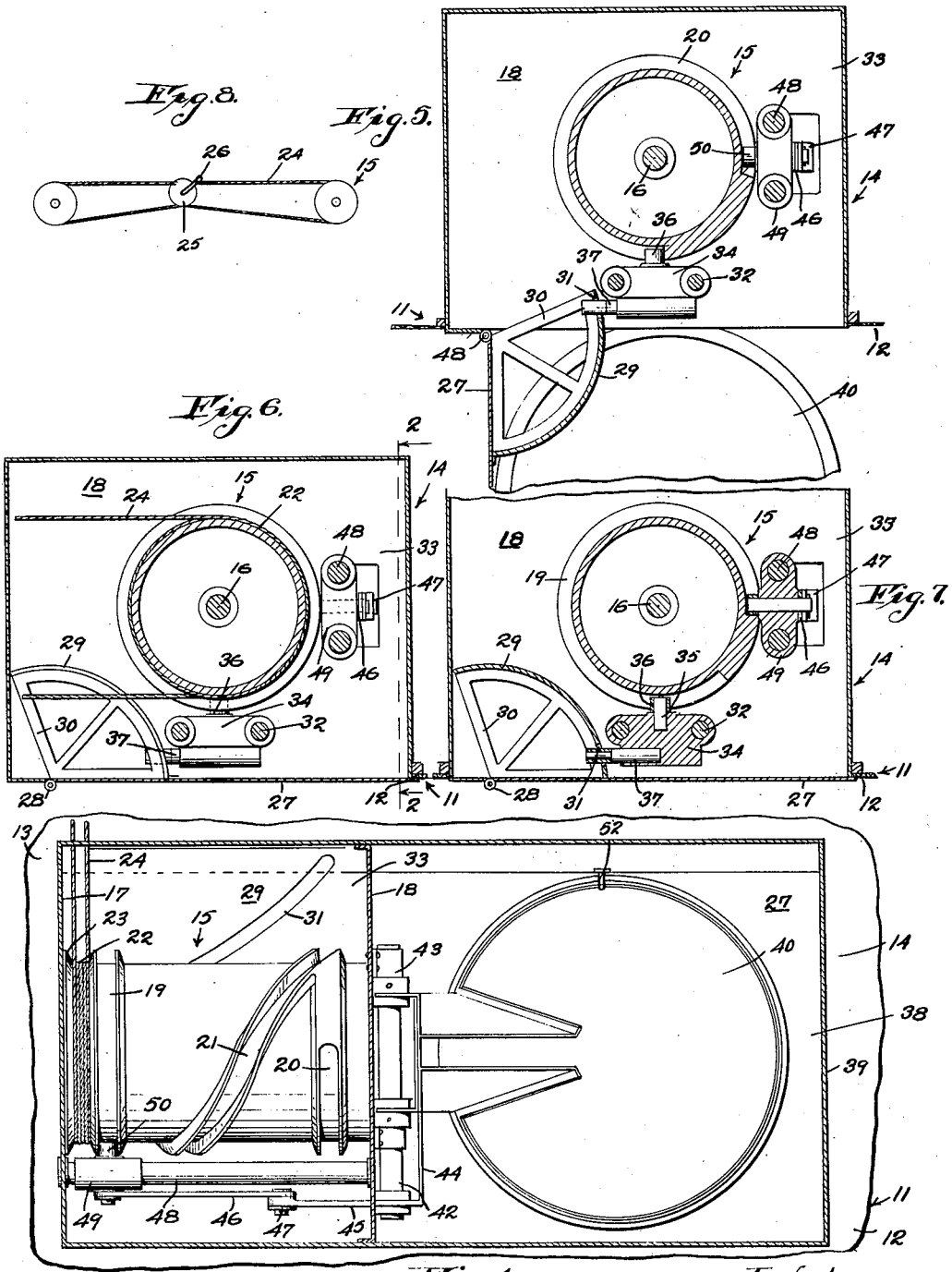

Patented Feb. 24, 1931

1,793,656

UNITED STATES PATENT OFFICE

EARL VAN HORN, OF HUNTINGTON PARK, CALIFORNIA, ASSIGNOR, BY DIRECT AND MESNE ASSIGNMENTS, OF ONE-FOURTH TO LESTER F. LEMM, OF LYNWOOD, CALIFORNIA, ONE-HALF TO RICHARD S. FLAHERTY, OF TORRANCE, CALIFORNIA, AND ONE-FOURTH TO H. E. ANSON, OF SOUTH GATE, CALIFORNIA

AEROPLANE LANDING LIGHT

Application filed August 29, 1928. Serial No. 302,677.

My invention is an aeroplane landing light adapted to be mounted in the wing of an aeroplane.

An object of my invention is the construction and mounting of a disappearing aeroplane landing light arranged so that when the light is either projected downwardly or horizontally, or at intermediate angles, the glare from the light is prevented from shining on the propellers or the forward part of the aeroplane.

Another object of my invention is the construction of an aeroplane landing light in which the light projector is housed in the aeroplane wing and may be utilized to project light directly downwardly while still housed in the wing, or the projector may be lowered below the wing so that its axis is horizontal to project the light forwardly. In this connection, another object of my invention is a feature of manipulating the light so that it may be cast downwardly at an inclination anywhere between the vertical downward projection and horizontal projection.

Another object of my invention is having a mounting for the projector lamp with a door or gate adapted to conform to the lower surface of the aerofoil of the wing when the lamp projector is in the housed position; and this door is controllable to open and close, and when fully open, depends vertically from the lower surface of the aerofoil and occupies a longitudinal plane in the direction of travel of the aeroplane.

Another object of my invention is a control device for the gate and for the projector lamp, so that the gate is first completely opened; and after this, the lamp is lowered from the housed position with its axis in a vertical direction to the position with its axis horizontal. A further feature of this object is the utilization of a cam-control drum having an engagement with the structure on the door to raise and lower such door, and having a control for the projector lamp operating in connection with the same cams. The drum is controlled by means of a cable or the like, from the cabin of the aeroplane; and preferably there are two lamps, one on each side of the fuselage.

In constructing my device, I utilize box-like housings which may be built into the aeroplane wing, the housing having a door pivotally mounted forming the lower closure. The box-like structure is divided by a partition, the forward part of the partition having a drum with its axis in alignment with the cord of the wing. The drum is provided with two substantially annular grooves at opposite ends, connected by a helical groove, the two end grooves and helical groove forming a cam. A pair of guides extending longitudinally underneath the drum, have a carriage with a pin thereon engaging in the grooves of the drum. This pin has a projecting finger which engages in a cam structure mounted on the door, this cam structure forming preferably part of a cylinder with its center on the line of the hinges of the door. Therefore, when the drum is rotated, the pin on the carriage follows the helical groove on the drum, and the finger engages a segmental cylinder on the door, thus lowering the door into open position, hanging vertically downwardly; and as above mentioned, the plane of the door when so suspended, is in the line of the forward travel of the aeroplane.

The projector lamp is housed in a compartment separated by a partition, from the drum, and is pivotally mounted on a pivot at right angles to the cord of the wing. The lamp has a bracket with an arm extending outwardly at right angles to the axis of the projector; and there is a link pivotally connected to this arm, the link being pivotally connected to a carriage mounted on guide rods, these rods extending along one side of the drum. A pin on this carriage engages in the circular and helical cam grooves on the drum; and therefore, on rotation of the drum, the projector lamp is moved from the housed position with its axis vertical to an operative position with its axis horizontal, and may be held in any intermediate position.

My invention is illustrated in the accompanying drawings, in which:

Figure 1 is a longitudinal section through a wing, showing the lamp in operative position for horizontal projection of light;

Fig. 2 may be considered a vertical, longitudinal, side elevation of the projector lamp and the controlling drum, this being taken on the line 2—2 of Fig. 6 in the direction of the arrows;

Fig. 3 is a view similar to Fig. 2, with the door and the lamp completely lowered for horizontal projection of light;

Fig. 4 may be considered as a plan view of the lamp and drum when enclosed in the housing, and is taken on the horizontal line 4—4 of Fig. 2 in the direction of the arrows;

Fig. 5 is a vertical, transverse section on the line 5—5 of Fig. 3, in the direction of the arrows;

Fig. 6 is a vertical, transverse section on the line 6—6 of Fig. 2, in the direction of the arrows, showing the door in a closed position and the reel for operating the drum;

Fig. 7 is a vertical, transverse section on the line 7—7 of Fig. 2, in the direction of the arrows, showing one of the circular grooves at the end of the cam and a section through the cylindrical cam segment connected to the door.

Fig. 8 is a diagram showing the control of the drums by a central reel in the control cabin.

In the general construction as shown in Fig. 1, the aeroplane wing is designated by the numeral 11, in which the lower aerofoil surface is indicated by 12. 13 designates a substantial beam extending lengthwise of the wing. The lamp and drum housing 14 are built into the wing, this housing being box-like and being open at the bottom.

The drum structure designated generally by the numeral 15, is mounted on a shaft 16 which is journalled in the forward end 17 of the box housing or in the beam 13. The opposite end is journalled in a partition 18 extending downwardly transversely of the box housing 14. This drum has a forward circular groove 19 and a rear circular groove 20, these being joined by a helical groove 21. I find it preferable to make these grooves by having flange-like structures secured to the drum and spaced the proper distance apart; but it is manifest that these grooves may be cut in a cylindrical drum, the interior of the drum being suitably supported and connected to the shaft 16. The portion of the drum forward of the groove 19, forms a reel 22 having a leading flange 23. A cable 24 is wound on this reel (note Fig. 6) and is driven by a controlling drum 25 mounted in the aeroplane cabin and controlled by a crank or the like 26 (note Fig. 8).

The door 27 is formed of a flat plate and is mounted on hinges 28, these hinges extending longitudinally at the lower part of the box housing 14. A cylindrical segment 29 is secured by arms 30 to the door, the center of this cylinder being the center of the hinges 28. This cylinder is provided with a cam slot 31 formed therein, the cylindrical structure being suitably supported at each side of the slot. A pair of guide rods 32 forming a track, are secured to the lower part of the box-like housing in the drum compartment 33 between the forward end 17 and the partition 18, and have a slidable carriage 34 mounted thereon. This carriage has an upwardly projecting end 35 with a roller bushing 36 or other equivalent anti-friction means thereon. A finger 37 extends laterally from the carriage and operates in the cam slot 31 of the cylinder 29.

In the lamp compartment 38 between the partition 18 and the rearward end 39 of the box housing 14, I mount a lamp projector 40. This has a bracket structure 41 secured to one side, this bracket being hinged on a horizontal pintle pin 42, this pintle pin being preferably secured in journals 43 extending rearwardly from the partition 18.

The connection from the projector lamp to the drum is as follows, having reference particularly to Figs. 2, 3, and 4.

A stiff plate 44 is secured to the bracket 41, extending sidewise therefrom, and this has an arm 45 extending at substantially right angles thereto. This arm passes through an opening in the partition 18 and is secured to a link 46 by a pivotal connection 47. There are a pair of rods 48 forming a guide track mounted between the end 17 and the partition 18 of the housing box 14. On these rods there is mounted a carriage 49 for sliding movement, and this carriage has a pin 50 fitting in the circular and helical cam grooves 19, 20 and 21.

The inside of the door 27 has an arcuate slot 51 formed by angles extending from the inside surface of the door. This slot is engaged by a pin 52 mounted on the side of the projector lamp adjacent the rim when the door is open. This holds the door in a rigid position relative to the lamp, when fully opened as shown in Fig. 3.

The manner of operation and functioning of my invention is substantially as follows:

It is desirable that there be two complete lamp outfits on opposite sides of the fuselage, and that these be arranged so that the doors when hanging down, will be between the projector lamps and the fuselage of the aeroplane, so that the doors will block the glare of light and prevent light from shining directly on the propeller. By operating the drum 25 in the cabin of the aeroplane, it is obvious that by means of the cables 24 or other suitable connection, that the drums 15 may be operated simultaneously and in the same manner. In ordinary travel, the projector lamp is housed in the box structure 14 as illustrated in Fig. 2. The gate is closed, and thus forms part of the lower surface of the wing. The gate is held in its closed position and the lamp is held in the position illustrated in Fig. 2 with its axis vertical by means of the pins on the carriers engaging in the slots on the drum and the slot in the cylinder section 29, and also due to the link and arm connection 46 and arm 45 to the projector lamp.

When the drum is rotated in the proper direction, the first action is to cause the pin on the carriage 34 engaging the drum, to travel in the helical groove 21 and thus move the carriage 34 longitudinally of the drum. During this action the pin 50 travels in the circular groove 19. This action continues until the door is lowered, occupying a vertical position by the pin 37 engaging in the slot 31. On further rotation of the drum 15 in the same direction, the pin 50 traveling in the groove 21 and connected with the link 46 by the carriage 49, pivots the lamp projector from the position shown in Fig. 2, to that of Fig. 3; i. e., from the position with its axis vertical, to the axis horizontal. In this same action, the pin 35 travels in the circular groove 20 at the end of the drum, and exerts no influence on the door which is fully opened. In this downward movement of the projector lamp, the stud 52 on the side of the lamp, follows the arcuate groove 51 in the door, which groove can be made in the nature of a dovetail, and thus holds the door in firm engagement with the lamp.

From the above description it will be seen that the projector lamp may be used to project a beam of light vertically downwardly when it is in the housed position of Fig. 2 after the door has been opened. Also, it may give a horizontal beam directed straight ahead when in the position of Fig. 3, or it may be inclined at any suitable angle between the positions shown in Figs. 2 and 3. No matter in which location the lamp may be, there is always the door between the lamp and the fuselage; hence, preventing the shining of light on the fuselage or on the propeller when centrally positioned. If the aeroplane is provided with wing-supported engines having propellers, the lamp can be placed in such a position so that it does not shine on the propeller and thereby cause interference with the handling of the aeroplane.

It is believed that the closing operation of the invention is clear, the first operation being to raise the lamp through the medium of the pin 50 on the carriage 49, drawing on the link 46, this pin operating in the cam groove on the drum; and after the lamp is fully housed, the door is closed through the medium of the pin 35 engaging in the cam groove on the drum, and the pin 37 operating the cam slot 31. When the lamp is housed and the door closed, the inter-connection of the drum with the lamp and with the door, holds these with the lamp housed and the door closed. Also, manifestly, the pressure of air on the door tends to hold this in closed position.

Various changes may be made in the principles of my invention without departing from the spirit thereof as set forth in the description, drawings and claims.

I claim:

1. In a device as described, an aeroplane wing having a projector lamp housed therein, a door in the bottom of the wing separate from the lamp, means to open said door, means to shift the projector lamp through the opening of the open door outside of the structure of the wing, means to return the lamp inside the wing structure, and means to close the door.

2. In a device as described, an aeroplane wing having a projector lamp housed therein, a door positioned in the lower surface of the wing separate from the lamp, means to open the door, means to lower the lamp from inside of the wing structure to a position adjacent the side of the door, the said door forming a screen to prevent a lateral projection of light on one side of the lamp, means to return the lamp to the wing, and means to close the door.

3. In a device as described, a wing structure, having a pivotally mounted door forming a closure for an opening in a lower surface of the wing, a projector lamp pivotally mounted above the door, the door having hinge pintles in alignment with the cord of the wing and the lamp pintle being at right angles thereto, means to open the door and hold same in a vertical depending position, and means to pivot the lamp downwardly whereby the axis of the lamp shifts from a vertical to a horizontal position.

4. In a device as described and claimed in claim 3, interconnecting means between the lamp and the door whereby the door is held in a rigid position when the lamp is lowered below the lower surface of the wing.

5. In a device as described, an aeroplane wing structure having an opening in its lower surface, a rotatable structure having cams thereon mounted in the wing structure, a projector lamp mounted in the structure, means to rotate the rotatable structure, and an interconnecting means between the cams and the lamp to lower the lamp from a position housed in the wing structure to a position below the wing structure, a door forming a closure for the opening in the wing structure, and an interconnecting means between the cams to open and close said door.

6. In a device as described, an aeroplane wing structure having an opening in its lower surface, a rotatable drum having cams thereon, a pivotally mounted projector lamp, means interconnecting the lamp and the cams on the drum to swing the lamp downwardly in an arc whereby its axis may be shifted from a vertical to a horizontal position, the reverse rotation of the drum raising said lamp, a door hingedly connected to the lower surface of the wing on hinge pintles in a line with the forward movement of the wing, and interconnecting means between the cams and the door to open the door on the rotation of the drum in one direction and to close the door on rotation of the drum in an opposite direction, the said interconnecting means holding the door open suspended vertically.

7. In a device as described, an aeroplane wing structure having an opening in its lower surface, a cam drum mounted on an axis extending in the direction of movement of the wing, cam grooves formed on said drum, a projector lamp pivoted on a pintle transverse to the direction of motion of the wing, a slidable carriage mounted on a guide track and having a connection to said cam grooves, and an arm and link connection between the carriage and the lamp to lower the lamp on rotation of the drum below the lower surface of the wing, and to tilt the lamp from its axis occupying a vertical to a horizontal position.

8. In a device as described and claimed in claim 7, the cam grooves having two circular grooves adjacent opposite ends of the drum, said grooves being connected by a helical groove.

9. In a device as described and claimed in claim 7, the cam grooves having two circular grooves adjacent opposite ends of the drum, said grooves being connected by a helical groove, a door forming a closure for the opening and pivotally connected to the lower part of the wing, a cylindrical segment having a cam thereon, a second slidable carriage having interconnecting means with the cams on the drum, and a connection from the cams on the drum to the cam on the door to open and close the door.

10. In a device as described, an aeroplane wing structure having an opening in its lower surface, a rotatable drum having an axis in the direction of movement of the wing, a cam track on the drum having circular portions at each end connected by a helical portion, a guide track extending longitudinally of the drum, a pivotally mounted projector lamp having its pivot transverse to the drum, an arm connected to the lamp, a link pivotally connected to said arm and to a carriage on the track, the said carriage having a connection with the cam, a second track having a second slidable carriage thereon with engagement with the cam, a door pivotally connected to the lower part of the wing, a segment of a cylinder secured to the door and having a cam slot therein engaged by a pin secured to the second carriage, and means to rotate the drum whereby the door is first opened and then the lamp is lowered and on a reverse movement the lamp is first housed and then the door closed.

11. In a device as described and claimed in claim 10, the door having an arcuate slot formed by angle structures extending outwardly therefrom and the lamp having a pin on its outer periphery adapted to engage in the said arcuate slot on the lowering movement of the lamp.

12. In a device as described, the combination of an aeroplane wing structure having an opening in its lower surface, a projector lamp housed therein and supported on a pivot, the axis of the lamp being vertical, a door forming a closure for the opening in the lower surface of the wing, and means controlled from the cabin of the aeroplane to first open the door and then lower the lamp and by a reverse control to first raise and house the lamp and then close the door.

13. In a device as described, an aeroplane structure having a surface with an opening and a door, a lamp housing with a mounting in the structure, said housing being separate from the door, means interconnecting the housing and the door, for first opening the door and then shifting the housing from inside of the structure through the door opening, whereby light may be projected from the said structure.

14. In a device as described, the combination of an aeroplane structure having a surface with an opening, a pivotally mounted door forming a closure for the opening, a pivotally mounted lamp housing in the structure and separate from the door, means to open the door, and means to turn the lamp housing on its pivot to shift the housing through the door opening to project light outside of the structure.

15. In a device as described, an aeroplane structure having a surface with an opening, a door forming a closure therefor, a lamp housing inside the structure, means to open said door, the door when opened having its surface in the direction of the line of flight, a lamp housing separate from the door, mounted in the structure, and means to shift the housing through the door opening to project light beyond the structure.

16. In a device as claimed in claim 15, the door being positioned when opened relative to the lamp housing and forming an obstruction to the path of light from the lamp housing to propellers or the like.

17. In a device as described, an aeroplane structure having an opening with a lamp housing positioned in the structure and shiftable through the opening, and means cooperating with the lamp housing to obstruct the path of light to prevent light striking a propeller or the like.

18. In a device as described, an aeroplane structure having a movable lamp housing, means to shift said housing, to direct light and a movable light obstructing means to obstruct the light from the lamp from shining on a propeller or the like.

19. A device as described, comprising in combination an aeroplane structure having an opening with a movable door forming a closure, a lamp housing positioned inside of the structure behind the opening, means to move the lamp housing through the opening when the door is opened, and an interconnecting means between the door and the lamp forming a bracing structure when the door is opened and the lamp extended through the opening.

In testimony whereof I have signed my name to this specification.

EARL VAN HORN.